US005087932A

United States Patent [19]

Chikano

[11] Patent Number: 5,087,932

[45] Date of Patent: Feb. 11, 1992

[54] ELECTROPHOTOGRAPHIC IMAGE FORMING TERMINAL HAVING AN IMPROVED ARRANGEMENT OF ELECTRICAL PARTS

[75] Inventor: Hisao Chikano, Tokyo, Japan

[73] Assignee: Ricoh Company, Ltd., Tokyo, Japan

[21] Appl. No.: 525,548

[22] Filed: May 18, 1990

[30] Foreign Application Priority Data

May 23, 1989 [JP] Japan ................................ 1-129451

[51] Int. Cl.$^5$ ........................................ G01D 15/00

[52] U.S. Cl. ................................ 346/145; 361/395; 361/424

[58] Field of Search .................... 346/145, 153.1, 108; 355/200; 361/383, 384, 391, 395, 424

[56] References Cited

U.S. PATENT DOCUMENTS 4,003,650 1/1977 Courtney et al. .................... 355/14
4,247,882 1/1981 Prager et al. ...................... 361/380
4,399,487 8/1983 Neumann ........................... 361/391
4,401,351 8/1983 Record ............................ 361/395 X
4,479,263 10/1984 Rosenfeldt et al. ........... 361/391 X
4,630,175 12/1986 Lerude et al. ...................... 361/424
4,712,160 12/1987 Sato et al. ...................... 361/395 X
4,800,463 1/1989 Ferchan et al. .................... 361/424
4,829,432 5/1989 Hershberger et al. .............. 361/424
4,899,182 2/1990 Inoue ................................ 346/153.1
4,899,254 2/1990 Ferchan et al. ................ 361/395 X

*Primary Examiner*—Benjamin R. Fuller
*Assistant Examiner*—Randy W. Gibson
*Attorney, Agent, or Firm*—Cooper & Dunham

[57] ABSTRACT

A terminal device having an electrophotographic recording function includes a main frame having a first accommodation portion and a second accommodation portion provided on a bottom portion of the main frame, and an image recording part. The terminal device also includes a controller board having a controller which generates character code data from a host system coupled to the terminal device, the controller board being accommodated in the first accommodation portion of the main frame, and an engine board having a print engine controller which generates image data from the character code data, the engine board being accommodated in the first accommodation portion of the main frame. The terminal device further includes a power supply unit providing the controller board and the print engine board with power, the power supply unit having a casing and a fan for cooling the power supply unit, the power supply unit being accommodated in the second accommodation portion of the main frame, and a shield member magnetically shielding the first and second accommodation portions from each other as well as an external device.

12 Claims, 5 Drawing Sheets

ELECTROPHOTOGRAPHIC IMAGE FORMING TERMINAL HAVING AN IMPROVED ARRANGEMENT OF ELECTRICAL PARTS

BACKGROUND OF THE INVENTION

The present invention generally relates to a terminal device coupled to a host computer, such as a laser beam printer. More particularly, the present invention is directed to an improved arrangement of electrical elements of the terminal device.

Recently, an electrophotographic apparatus such as a laser beam printer serves as a terminal device of a host computer. Such a laser beam printer system having a laser beam printer and a host computer is disclosed in Japanese Laid-Open Patent Application Nos. 61-129656 and 63-43164, for example. The terminal device disclosed in these Japanese applications has an electrical element accommodating portion provided on a bottom of the terminal device. An engine board on which a print engine is mounted, a controller board on which a controller is mounted and a power supply unit are accommodated in the electrical element accommodating portion. When replacing an electrical element with a new one or repairing the terminal device, the terminal device is turned upside down. If the terminal device is of a large size or coupled to the host computer, the operation of turning it upside down is very troublesome.

SUMMARY OF THE INVENTION

It is a general object of the present invention to provide an improved terminal device in which the above-mentioned disadvantages are eliminated.

A more specific object of the present invention is to provide a terminal device having an improved arrangement in which it is very easy to replace an electrical element or repair the terminal device.

The above-mentioned objects of the present invention are achieved by a terminal device having an electrophotographic recording function comprising:

a main frame having a first accommodation portion and a second accommodation portion provided on a bottom portion of the main frame;

image recording means, provided in the main frame, for recording an image on a photosensitive member and for transferring the image on paper which passes on the photosensitive member;

a controller board having a controller which generates character code data from a host system coupled to the terminal device, the controller board being accommodated in the first accommodation portion of the main frame;

an engine board having a print engine controller which generates image data related to the image from the character code data, the engine board being accommodated in the first accommodation portion of the main frame;

a power supply unit providing the controller board and the print engine board with electrical power, the power supply unit having a casing and a fan for cooling the power supply unit, the power supply unit being accommodated in the second accommodation portion of the main frame; and a shield member magnetically shielding the first and second accommodation portions from each other as well as an external device.

BRIEF DESCRIPTION OF THE DRAWINGS

Other objects, features and advantages of the present invention will become apparent from the following detailed description when read in conjunction with the accompanying drawings, in which.

DESCRIPTION OF THE PREFERRED EMBODIMENTS

Figure 1:
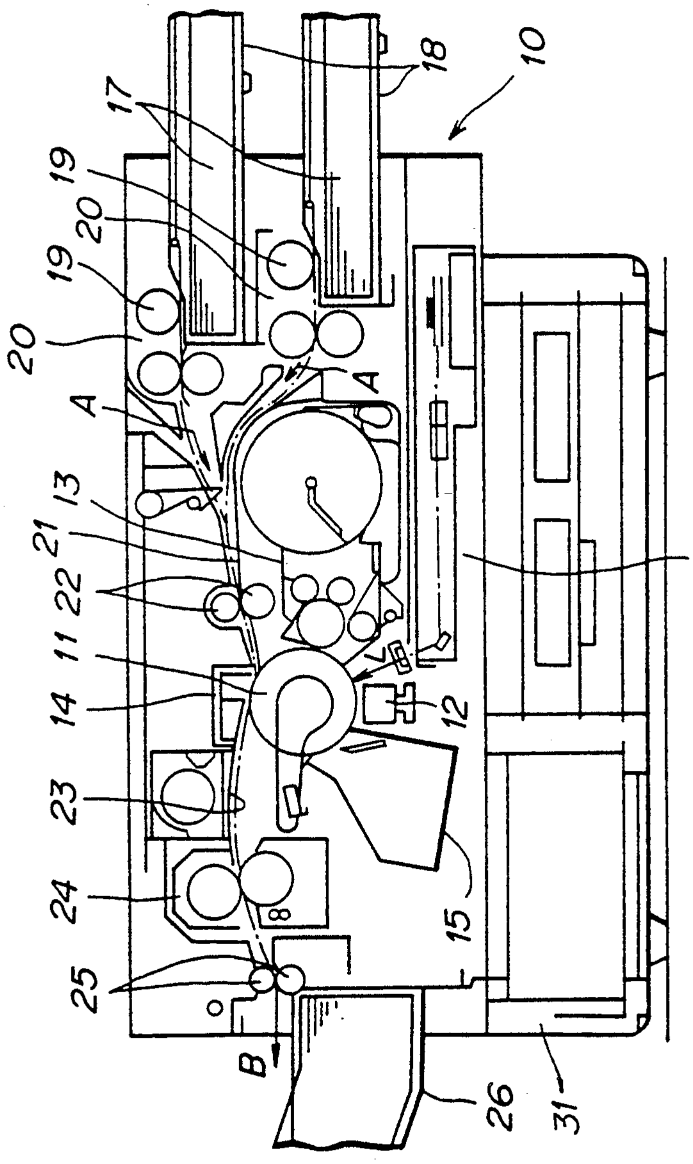
FIG. 1 is a diagram illustrating the entire structure of a laser beam printer according to a preferred embodiment of the present invention.

Referring to FIG. 1, there is illustrated the entire internal structure of a laser beam printer main frame 10 according to a preferred embodiment of the present invention. The laser beam printer main frame 10 comprises a photosensitive drum 11. Around the photosensitive drum 11, there are arranged a corona charger 12, a developer 13, a transfer/detach charger 14 and a cleaning unit 15 in this order in the counterclockwise direction. A write unit 16 having optical elements such as a polygonal mirror and cylindrical lenses is provided under the developer 13. Two paper feed cassettes 18 for feeding paper 17 are provided on the right side of the laser beam printer main frame 10. Paper feed mechanisms 20 having paper feed rollers 19 are provided for leading end portions of the paper feed cassettes 18. The paper feed mechanisms 20 are coupled to a pair of registration rollers 22 through a paper transport path 21. The pair of registration rollers 22 is located above the developer 13. A transport mechanism 23 and a fixing unit 24 are arranged on the left side of the transfer/detach charger 14 opposite to the registration rollers 22. Paper eject rollers 25 are provided on the upstream side of the fixing unit 24. A paper receiving tray 26 projecting from the laser beam printer main frame 10 is provided at the end of the paper transport path.

Figure 2:
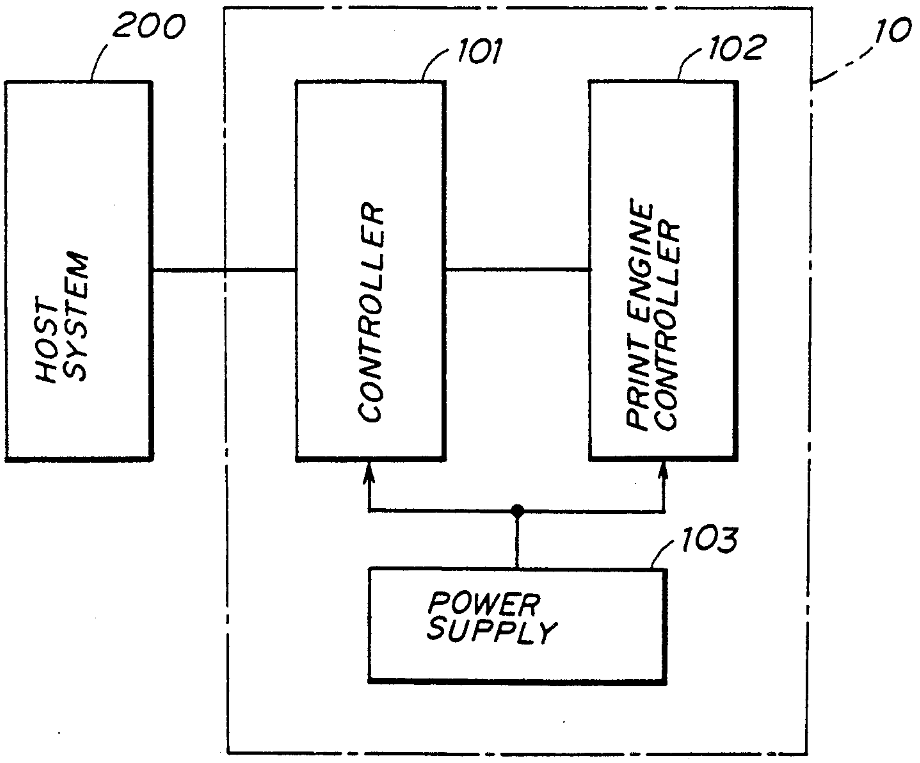
FIG. 2 is a block diagram of an electrical system provided in the laser beam printer shown in FIG. 1.

Referring to FIG. 2, there is illustrated an electrical system of the laser beam printer shown in FIG. 1. The laser beam printer includes a controller 101, a print engine controller 102 and a power supply unit 103. A host system 200 is connected to the controller 101. The host system 200 supplies the controller 101 with character code data. The controller 101 generates image data from the received character code data. The print engine controller 102 generates a print image from the image data supplied from the controller 101. The write unit 16 is controlled on the basis of the print image generated by the print engine controller 102. The print engine controller 102 also controls mechanical elements, such as the photosensitive drum 11 and the registration rollers 22. The power supply unit 103 supplies the controller 101 and the print engine controller 102 with power.

During printing, paper feed rollers 19 are driven and a sheet of paper is fed from one of the paper feed cassettes 18 in the direction indicated by the arrow A. The paper 17 is transported on the paper transport path 21 to a position where a leading edge of the paper 17 comes into contact with the registration rollers 22. The photosensitive drum 11 is rotated in the counterclockwise direction. During one rotation of the photosensitive drum 11, the following operation is carried out. First, the surface of the photosensitive drum 11 is uniformly electrified by the corona charger 12. Next, a laser beam L emitted from the write unit 16 is projected onto the surface of the photosensitive drum 11 so that an electrostatic latent image is formed thereon. Then, the electrostatic latent image is changed to a visual image by supplying the drum 11 with toner particles by means of the developer 13. Then the paper 17 is transported toward the photosensitive drum 11 in synchronism with the rotation of the photosensitive drum 11. When the paper 17 passes on the photosensitive drum 11, the visual image formed on the surface of the photosensitive drum 11 is transferred on the paper 17. Then the paper 17 is detached electrostatically from the surface of the photosensitive drum 11 by the transfer/detach charger 14. The surface of the photosensitive drum 11 is then cleaned by the cleaning unit 15 so that toner particles left on the surface of the photosensitive drum 11 are eliminated therefrom. On the other hand, the paper 17 is transported to the fixing unit 24 by the transport mechanism 23, which fixes the transferred image on the paper 17. After that, the paper 17 having the fixed image is transported in the direction indicated by the arrow B by the paper eject unit 25, and is then supplied to the paper receiving tray 26.

Figure 3:
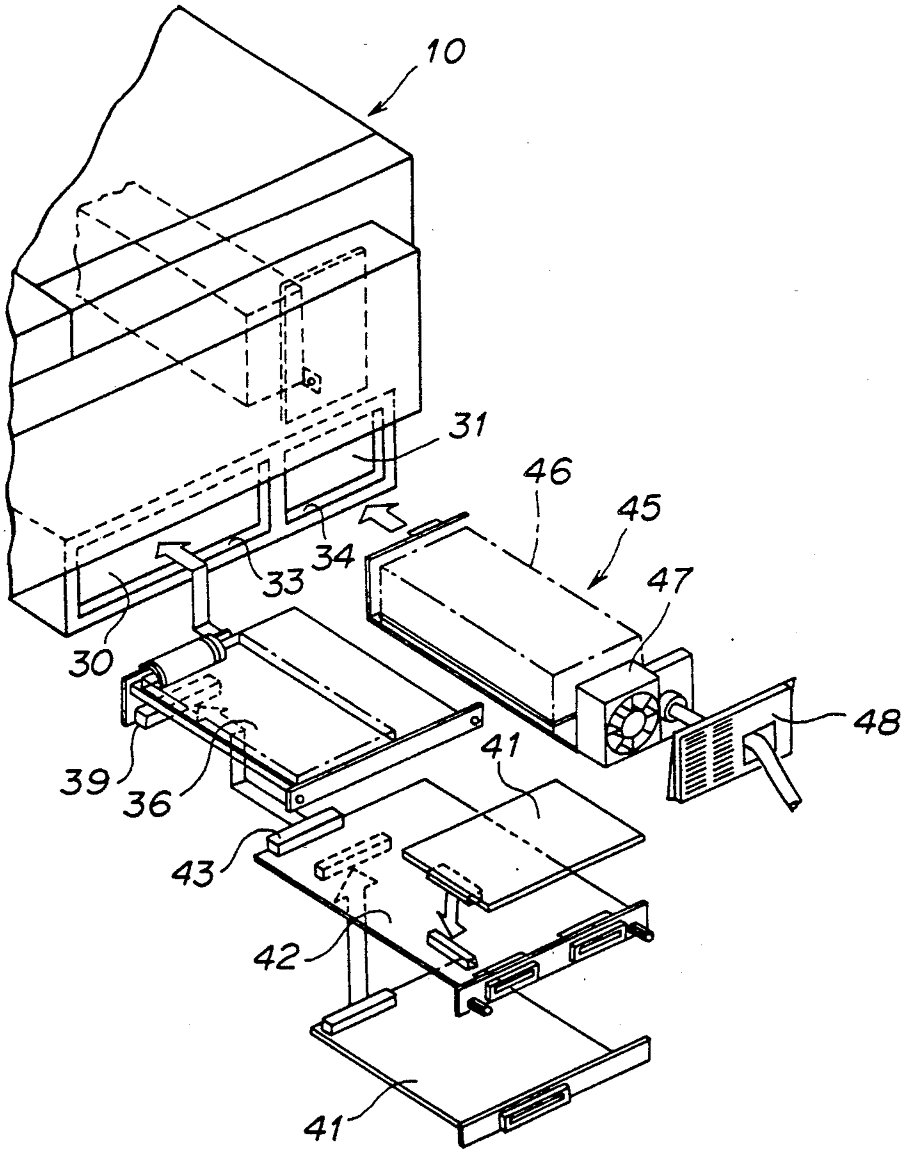
FIG. 3 is an exploded perspective view of illustrating how to attach electrical components to a main frame of the laser beam printer shown in FIG. 1.

The laser beam printer main frame 10 has a first electrical element accommodating portion 30 and a second electrical element accommodating portion 31, both of which are formed on a bottom portion of the main frame 10. The first and second electrical element accommodating portions 30 and 31 are arranged side by side, as shown in FIG. 3. The first electrical element accommodating portion 30 has an opening 33 formed on the back side of the main frame 10, and the second electrical element accommodating portion 31 has an opening 34 formed thereon.

Figure 4:
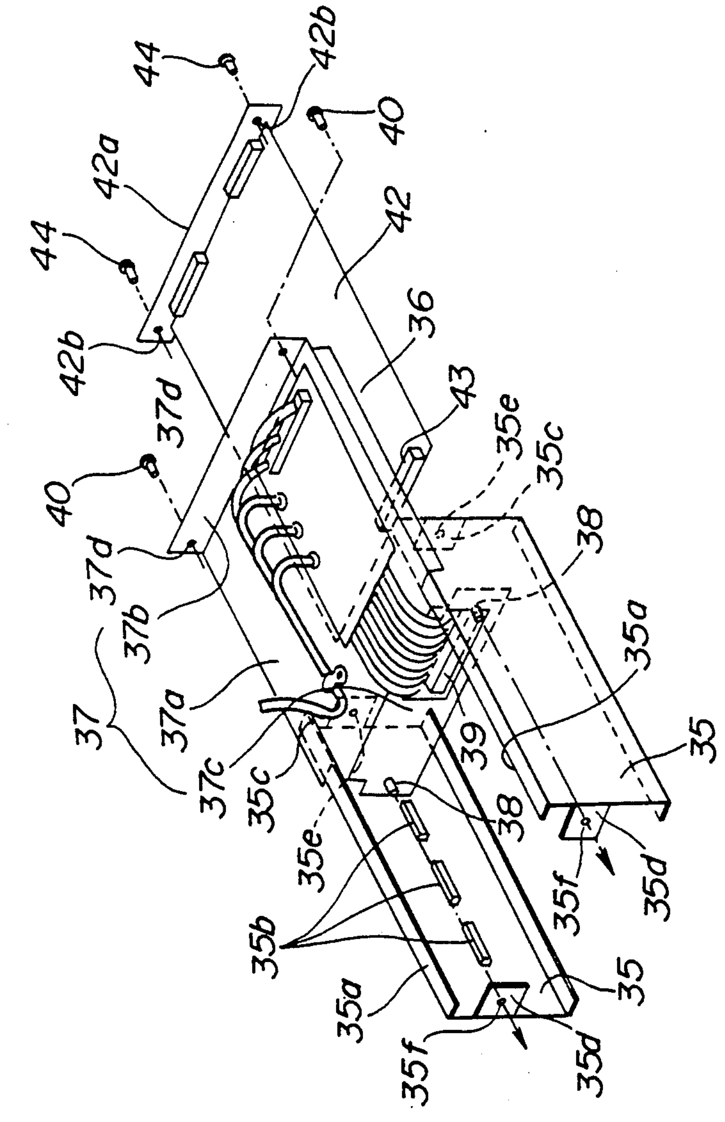
FIG. 4 is an exploded perspective view of an electrical element accommodating portion.
Figure 5:
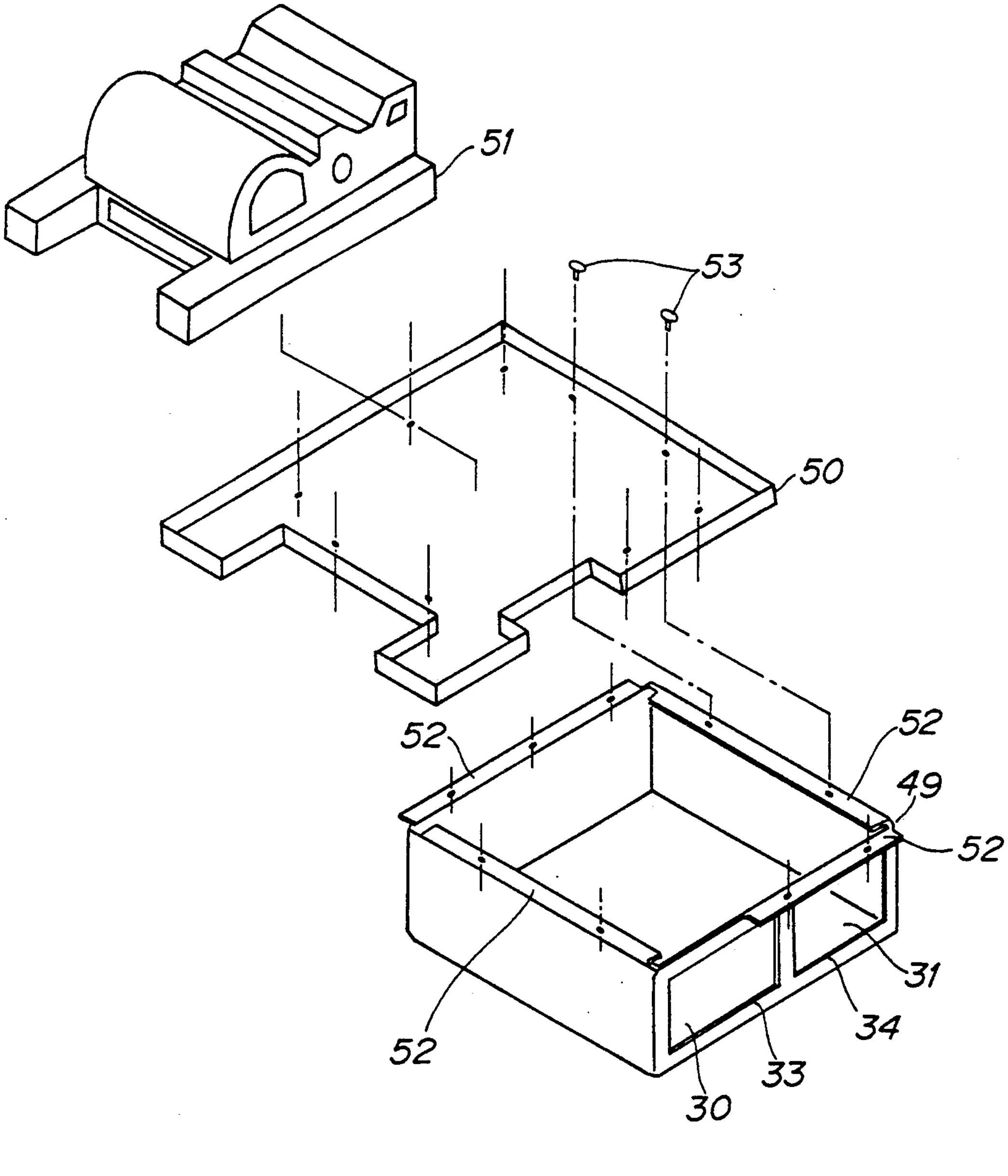
FIG. 5 is an exploded perspective view of a structure having electrical element accommodating portions provided in the laser beam printer shown in FIG. 1.

Referring to FIG. 4, two opposite side fences 35 are arranged in the first electric element accommodating portion 30. An upper end of each of the side fences 35 is horizontally bent so that a guide edge **35*a* is formed. The guide edges 35*a* of the side fences 35 are opposite to each other. A plurality of guide projections 35*b* are arranged into a line at intervals on an inner surface of each of the side fences 35. The guide projections 35*b* are located at an intermediate level of each of the side fences 35. A front end of each of the side fences 35 on an entrance side of the first electrical element accommodating portion 30 is partially bent inward so that a bent piece 35*c* is formed. Similarly, a rear end of each of the side fences 35 opposite to the entrance side is partially bent inward so that a bent piece 35*d* is formed. Each of the two bent pieces 35*c* has a pin hole 35*e*, and each of the two bent pieces 35*d* has a pin hole 35*f***.

An engine board 36 on which the aforementioned print engine controller 102 (FIG. 2) is mounted is inserted into the first electrical element accommodating portion 30 through the opening 33. The engine board 36 is placed and slided on the guide edges **35*a* and is guided by the side fences 35. The engine board 36 has a horizontal portion 37*a*. An upward portion 37*b* is formed at a front end of the horizontal portion 37*a*, and a downward portion 37*c* is formed at a rear end thereof. A bracket 37 is mode up of the horizontal portion 37*a*, the upward portion 37*b* and the upward portion 37*c*. Two through holes 37*d* are formed on both sides of the upward portion 37*b*. Two pins 38 are formed on an outer surface of the downward portion 37*c*. A connector 39 is also provided on the downward portion 37*c*. The pins 38 are inserted into the pin holes 35*f* and screws 40 penetrating the through holes 37*d* are inserted into corresponding screw holes (not shown) formed in the laser beam printer main frame 10 so that the engine board 36 is fixed to the main frame 10**.

A controller board 42 on which the controller 101 (FIG. 2) is mounted is inserted into the first electrical element accommodating portion 30 from the opening 33 so that the controller board 42 slides on the guide projections **35*b* formed on the inner surfaces of the side fences 35. The controller board 42 has a lid portion 42*a* formed on the entrance side. The lid portion 42*a* has two through holes 42*b* on both sides thereof and a connector 43 on the rear side thereof. The connector 43 is coupled to the connector 39, and screws 44 penetrating the through holes 42*b* engage with the screw holes 35*e* formed on the bent piece 35*c* so that the controller 42 is fixed in the first electrical element accommodating portion 30**.

A power supply unit 45 corresponding to the power supply unit 103 shown in FIG. 2 is inserted into the second electrical element accommodating portion 31 through the opening 34. The power supply unit 45 has a casing 46 in which electrical elements for forming a power supply circuit are accommodated, and a fan 47 for cooling the electrical elements in the casing 46. The power supply unit 45 further includes a front cover 48 which covers the opening 34. When the front cover 48 is designed to be press-fitted into the opening 34 so that the power supply unit 45 is fixed in the second electrical element accommodating portion 31.

The structure shown in FIG. 4 is accommodated in a metallic lower frame 49. The metallic lower frame 49 has the openings 33 and 34. The top of the metallic lower frame 49 is open. Flange members 52 having screw holes are formed on upper ends of the metallic lower frame 49. It is preferable that a large number of screw holes be arranged at almost the same intervals for each of the flange members 52. A metallic plate-shaped upper member 50 is mounted on the flange members 52 of the metallic lower frame 49 and fixed thereto by screws 53. An inner space defined by the metallic lower frame 49 and the plate-shaped upper member 50 are magnetically shielded. With this arrangement, it becomes possible to prevent an electromagnetic wave from being leaked outside of the power supply unit 45. The side fences 35 function to magnetically shield the first electrical element accommodating portion from the second electrical element accommodating portion. A mechanical structure 51 accommodating some mechanical elements, such as the developer unit 13, the cleaning unit 15 and the fixing unit 24 is mounted on the plate-shaped upper member 50. It is preferable that the mechanical structure 51 be formed of resin. Alternatively, it is possible to integrally form the metallic lower frame 49 and the side fences 35 (FIG. 4).

When replacing the engine board 36 by a new one or repairing the same, the screws 40 and 44 are removed and then the engine board 36 is taken out together with the controller board 42. When replacing the controller board 42 by a new one or repairing the same, only the screws 44 are removed and then only the controller board 42 is drawn. Of course, it is possible to remove the screws 40 and 44 and draw the controller board 42 together with the engine board 36. When replacing the power supply unit 45 with a new one or repairing the same, the front cover 48 is removed and the power supply unit 45 is drawn. In the above-mentioned way, it should be noted that it is unnecessary to turn the laser beam printer upside down.

The present invention is not limited to the specifically described embodiment, and variations and modifications may be made without departing from the scope of the present invention.

What is claimed is:

1. A terminal device having an electrophotographic recording function comprising:

a main frame of said terminal device;

a metallic lower frame provided in a bottom portion of said main frame, said metallic lower frame having a first accommodation portion and a second accommodation portion, said metallic lower frame electromagnetically shielding an inside portion of said metallic lower frame from an outside portion thereof, and said metallic lower frame having a first opening through which said first accommodation portion is partially exposed, and a second opening through which said second accommodation portion is partially exposed;

image recording means, provided in said main frame and positioned above said metallic lower frame, for recording an image on a photosensitive member and for transferring said image on paper which passes on said photosensitive member;

a controller board having a controller which generates character code data from a host system coupled to said terminal device, said controller board being accommodated in said first accommodation portion of said metallic lower frame, said controller board being detachable from said first accommodation portion through said first opening;

an engine board having a print engine controller which generates image data related to said image from said character code data, said engine board being accommodated in said first accommodation portion of said metallic lower frame, said engine board being detachable said first accommodation portion through said first opening; and a power supply unit providing said controlling board and said print engine board with electrical power, said power supply unit having a casing and a fan for cooling said power supply unit, said power supply unit being accommodated in said second accommodation portion of said metallic lower frame, said power supply unit being detachable from said second accommodation portion through said second opening, and a window generated by said fan being transmitted to said first accommodation portion so that said controller board and said engine board can also be cooled by said fan; and a shield member magnetically shielding said first and second accommodation portions from each other as well as an external device.

2. A terminal device as claimed in claim 1, wherein said first accommodation portion and said second accommodation portion are arranged side by side.

3. A terminal device as claimed in claim 1, wherein said first accommodation portion comprises side fences opposite to each other, and said controller board and said engine board are supported by said side fences.

4. A terminal device as claimed in claim 3, wherein said controller board and said engine board supported by said side fences overlap each other and are elevationally spaced apart from each other.

5. A terminal device as claimed in claim 3, wherein:

each of said side fences has guide projections which project from an inner surface thereof and are horizontally arranged into a line;

each of said side fences has a guide edge formed on a top thereof;

said engine board is mounted on said guide edge of each of said side fences; and said controller board is mounted on said guide projections.

6. A terminal device as claimed in claim 1 wherein said power supply unit has a front cover which is press-fitted into said second opening.

7. A terminal device as claimed in claim 1, wherein said first and second openings are provided on a rear side of said terminal device.

8. A terminal device as claimed in claim 4, wherein said controller board having a connector, and said engine board having a connector which is connected to said connector of said controller board when said controller board and said engine board are accommodated in said first accommodation portion.

9. A terminal device as claimed in claim 4, wherein said engine board has a downward member having a connector, and said engine board has a connector positioned so that said controller board and said engine board are accommodated in said first accommodation portion.

10. A terminal device as claimed in claim 9, wherein said downward member has pins which elevationally project from the downward member, and said main frame has holes with which said pins formed on said downward member engage when said engine board is accommodated into said first accommodation portion.

11. A terminal device as claimed in claim 1, wherein said controller board has a front lid which partially covers said first opening and said front lid has holes, and wherein said main frame has screw holes with which screws passing though said holes provided in the front lid engage.

12. A terminal device as claimed in claim 1, wherein said terminal device is a laser beam printer.

* * * * *